United States Patent [19]

Simmons

[11] 4,108,055
[45] Aug. 22, 1978

[54] MOBILE BROILER ROTISSERIE APPARATUS

[76] Inventor: James Simmons, 5225 St. Joseph Ave., Stevensville, Mich. 49127

[21] Appl. No.: 787,580

[22] Filed: Apr. 14, 1977

[51] Int. Cl.$^2$ ............................................. A47J 37/04
[52] U.S. Cl. ................................. 99/421 H; 99/339; 99/357; 126/276
[58] Field of Search ................. 99/419, 421 R, 421 H, 99/421 HH, 422, 425, 339, 340, 357; 126/25 R, 25 A, 268, 276

[56] References Cited

U.S. PATENT DOCUMENTS

| 3,025,782 | 3/1962 | Stall | 99/339 |
|---|---|---|---|
| 3,447,445 | 6/1969 | Koziol | 99/421 R |
| 3,683,791 | 8/1972 | Rast | 99/340 |
| 3,861,288 | 1/1975 | Cluff | 99/339 X |
| 3,943,837 | 3/1976 | Trkla | 99/421 H |

*Primary Examiner*—Edward J. McCarthy
*Attorney, Agent, or Firm*—Blanchard, Flynn, Thiel, Boutell & Tanis

[57] ABSTRACT

A mobile broiler rotisserie apparatus including a trailer frame having road engaging wheels thereon and a hitch for connection to a vehicle. The trailer frame has an open top chamber having sidewalls and a bottom wall mounted thereon with a pair of spaced support brackets being secured to opposed walls of the chamber adjacent the upper edges thereof. Rotatable food supporting devices are mounted on the support brackets in spaced relation from the bottom wall and vertically spaced above a controllable heat generator positioned in the spacing between the rotatable food supporting devices and the bottom wall for cooking foods supported on the rotatable food supporting devices. A hood is pivotally secured to one of the upper edges of the open top chamber and is movable between open and closed positions relative to the open top of the chamber. An elongated trough is mounted in the chamber in vertical alignment with the rotatable food supporting device and is inclined from one end of the chamber downwardly toward and out through an opening in the wall of the chamber at the opposite end thereof. A drive mechanism is operatively connected to the rotatable food supporting device and has a rotatable output characteristic such that the juice from food mounted on the rotatable food supporting device will fall therefrom during cooking and into the trough. The heat from the heat generator will maintain the collected juice in the trough in a liquid form so that it will flow down the incline of the trough and out through the opening for collection.

4 Claims, 7 Drawing Figures

MOBILE BROILER ROTISSERIE APPARATUS

FIELD OF THE INVENTION

This invention relates to a mobile broiler rotisserie apparatus and, more particularly, relates to a mobile broiler rotisserie apparatus mounted on a trailer frame having road engaging wheels and a hitch for connection to a vehicle and, in addition, the provision of a juice collecting trough inclined within the mobile broiler rotisserie apparatus for collecting juices falling from food mounted on the rotatable rotisserie member.

BACKGROUND OF THE INVENTION

Outdoor rotisserie cooking apparatus of various kinds are available in the market place. However, rotisserie units for use in catering large outdoor cookouts is not available and the subject matter of my invention discussed below relates to just such an apparatus for the aforesaid use. While the mobile broiler rotisserie apparatus described herein arose out of a need for equipment for use in providing catering services for large cookouts or for providing rental equipment for such purposes, it is to be recognized that other uses could be possible and the following disclosure is not to be limiting.

Accordingly, it is an object of this invention to provide a mobile broiler rotisserie apparatus mounted on a trailer frame and having road engaging wheels and a hitch for attachment to a vehicle.

It is a further object of this invention to provide a mobile broiler rotisserie apparatus, as aforesaid, wherein the drive mechanism for rotating the rotatable food supporting device has a rotatable output characteristic of between 0.5 and 1.0 rpm and wherein a juice collecting trough is provided in vertically aligned relation to the axis of rotation of the rotatable food supporting device so that juices from foods mounted on the rotatable food supporting device will fall into the trough.

It is a further object of this invention to provide a mobile broiler rotisserie apparatus, as aforesaid, wherein the trough is inclined from one end of the mobile broiler rotisserie apparatus to the other so that the juices collected therein will flow out through an opening in the sidewall of the apparatus for external collection.

It is a further object of this invention to provide a mobile broiler rotisserie apparatus, as aforesaid, wherein the heat generating device in the mobile broiler rotisserie apparatus is positioned beneath the trough so that juices collected within the trough will remain in a liquid state and, hence, flow down the incline for external collection.

It is a further object of this invention to provide a mobile broiler rotisserie apparatus, as aforesaid which will comply with Environmental Protection Agency regulations and other health agency regulations.

It is a further object of this invention to provide a mobile broiler rotisserie apparatus, as aforesaid, which is easy to clean and maintain in proper operating condition.

SUMMARY OF THE INVENTION

In general, the objects and purposes of the invention are met by providing a mobile broiler rotisserie apparatus having a trailer frame means including road engaging wheel means and hitch means for connection to a vehicle. An open top chamber having sidewalls and a bottom wall is mounted on the trailer frame means. A support is provided adjacent the upper edge of a pair of opposed walls in the chamber for holding and supporting a rotatable food supporting means mounted thereon and in spaced relation from the bottom wall of the chamber. Controllable heat generating means are positioned in the spacing between the rotatable food supporting means and the bottom wall for cooking foods supported on the rotatable food supporting means. A hood is pivotally secured to an upper edge of the chamber and is movable between open and closed positions relative to the open top of the chamber. Trough means are mounted in the chamber above the heat generating means and in vertical alignment with the rotatable food supporting means. One of the walls of the chamber has an opening therein and the trough means is inclined downwardly from one end of the chamber to a terminal end located externally of the chamber. The trough means occupies a space which is in the range of 15 to 25 per cent of the width of the chamber when viewed in a direction parallel to the axis of rotation of the food supporting means. A drive mechanism is operatively connected to the rotatable food supporting means and has a rotatable output characteristic in the range of 0.5 to 1.0 rpm so that juice from the meats mounted on the rotatable food supporting means will fall therefrom during cooking and into the trough means and the heat from the heat generating means will maintain the collected juice in the trough means in liquid form so that it will flow down the incline of the trough means and out through the opening for external collection.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Figure 1:
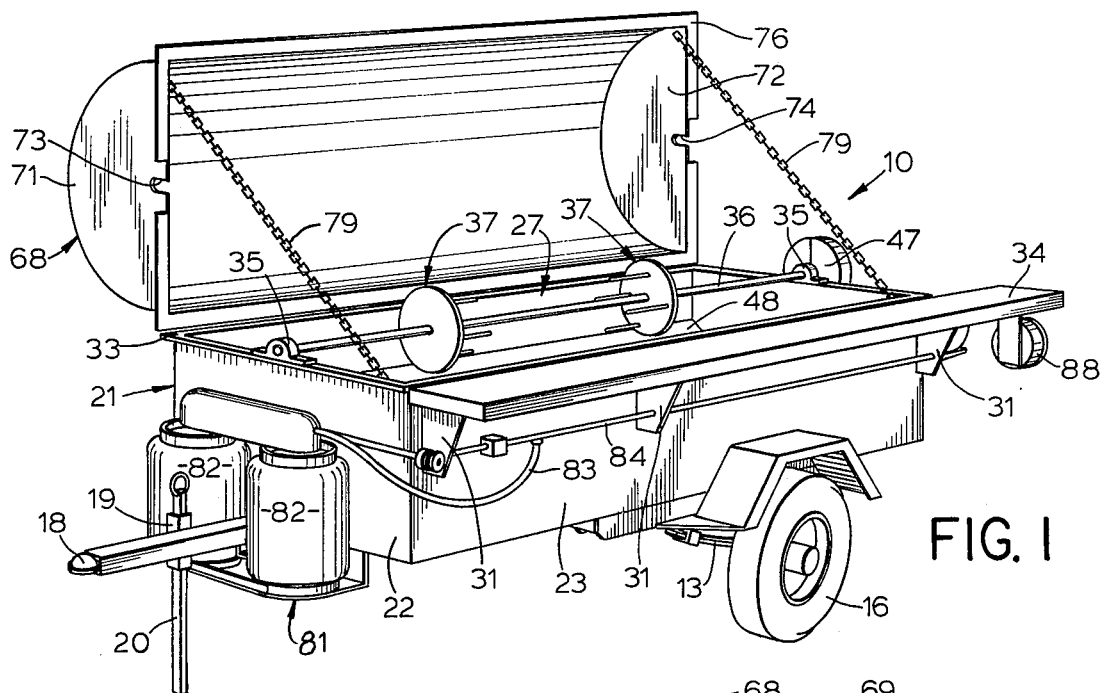
FIG. 1 is a front perspective view of the mobile broiler rotisserie apparatus embodying my new invention.

A mobile broiler rotisserie apparatus 10 embodying my invention is illustrated in the drawings and includes a trailer frame 11 having an axle secured through a conventional leafspring construction 13 and U-bolts 14 to the trailer frame 11. Wheels 16 are rotatably secured to the opposite ends of the axle 12 in the usual manner. A trailer tongue 17 is connected to the trailer frame 11 and has a hitch construction 18 on the free end thereof. A tubular bracket 19 is secured to the trailer tongue 17 and the axis of the opening therethrough extends vertically. A post 20 is received in the tubular bracket 19 and is maintained in a fixed position by a lock pin 20A received in aligned holes provided in both the tubular bracket 19 and the post 20 to fixedly position the post 20 relative to the trailer tongue 17. The purpose of the post 20 and its relative positioning with respect to the trailer tongue 17 is to permit an adjustment of the trailer frame 11 so that it is generally horizontal when in the parked position and when the hitch construction 18 is disconnected from a vehicle.

An open top box 21 having four sidewalls 22, 23, 24 and 25 and a bottom wall 26 is mounted on the trailer frame 11 and secured thereto by any conventional type of construction, as by welding. The open top box defines a chamber 27. A plurality of brackets 31 are secured to the outer periphery of one of the sidewalls 23 and extends outwardly therefrom. The brackets each have a horizontal flange thereon. The upper edge of the sidewalls of the chamber 27 each have a curled-over rim construction 33. The rim construction is elevated above the horizontal flange 32. A wooden support surface 34 is mounted on and secured to the horizontal flanges 32 and the thickness of the support surface 34 is generally equal to the spacing between the horizontal flange and the upper surface of the rim construction 33. The support surface 34, while being made of wood in this particular embodiment, can be made of any type of material so long as the material is generally resistant to the transmission of heat.

A pair of axially aligned bearing housings 35 are fixedly secured to the rim construction 33 at the upper edge of the front and rear walls 22 and 24, respectively, of the chamber 27. An elongated rod 36 is rotatably supported in the bearing housings 35. A plurality of food holding devices 37 are selectively secured to the rod 36 for movement therewith. The axial spacing between the food holding devices 37 is adjustable by convenient means so that various sizes of foods can be mounted on the rod 36 in the usual manner.

A shelf 38 is secured to the external surface of the rear wall 24 of the chamber 27 and projects outwardly therefrom. A motor, here an electric motor 39, is mounted on the shelf 38. A gear reducer mechanism 41 is secured to the output end of the motor 39 and has a rotatable output shaft 42 on which is fixedly secured a sprocket 43. A sprocket 44 is fixedly secured to the rod 36 and is in radial alignment with the sprocket 43. A chain 46 connects the two sprockets 43 and 44 so that the motor 39 will effect a rotational drive of the rod 36. A chain guard housing 47 encases the chain and sprocket connection between the gear reducer 41 and the rod 36.

Figure 7:
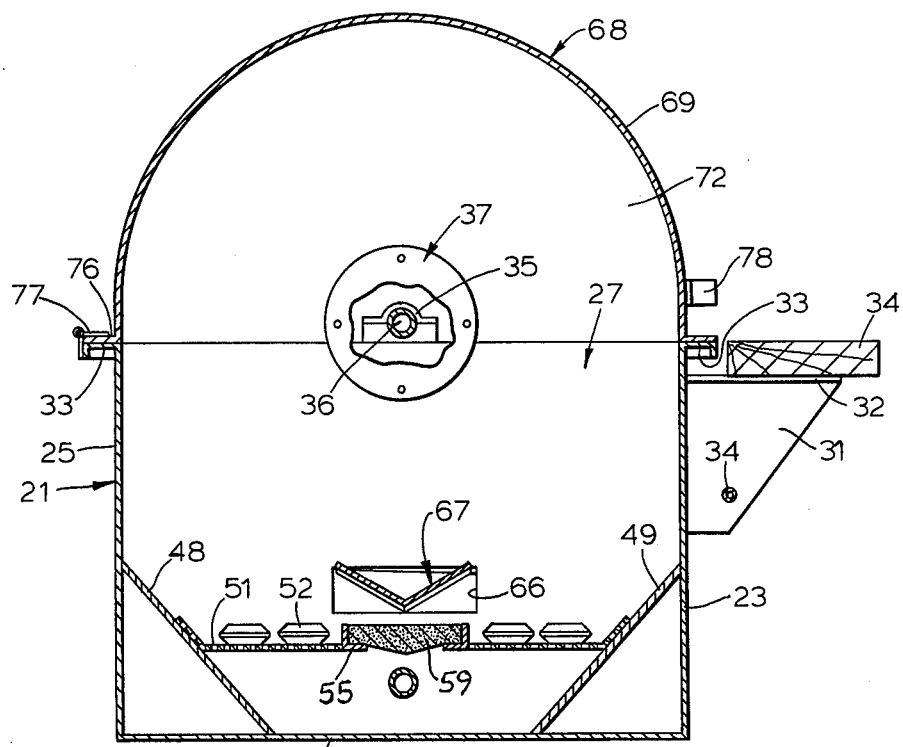
FIG. 7 is a sectional view taken along the line VII—VII of FIG. 3.

Referring to FIG. 7, an elongated panel 48 is secured to and extends between the sidewall 25 and the bottom wall 26. The panel 48 is inclined at an angle of approximately 45° within the chamber 27 and extends the length of the chamber 27. A similar panel 49 is secured to and extends between the sidewall 23 and the bottom wall 26 and is inclined at approximately the same angle. A pair of spaced and parallel angle pieces 55 are secured to and extend between the sidewalls 22 and 24. A pair of perforated sheets of metal 51 are supported on and extend between each of the panels 48 and 49 and the angle pieces 55 and in spaced relation from the bottom wall 26. The horizontal leg portion of the angle pieces 55 each define a shelf. A plurality of ceramic stones or the like are mounted on the perforate sheets of metal 51 for purposes of collecting grease and other flammable materials dripping from the food and preventing direct contact of these materials with the heat generating units discussed in detail below. The perforated sheets metal 51 are spaced upwardly from the bottom wall 26. A fire brick 59 structure is mounted on the shelf defined by the angle pieces 55 to deflect the heat from structure located thereabove and which is discussed below.

Figure 6:
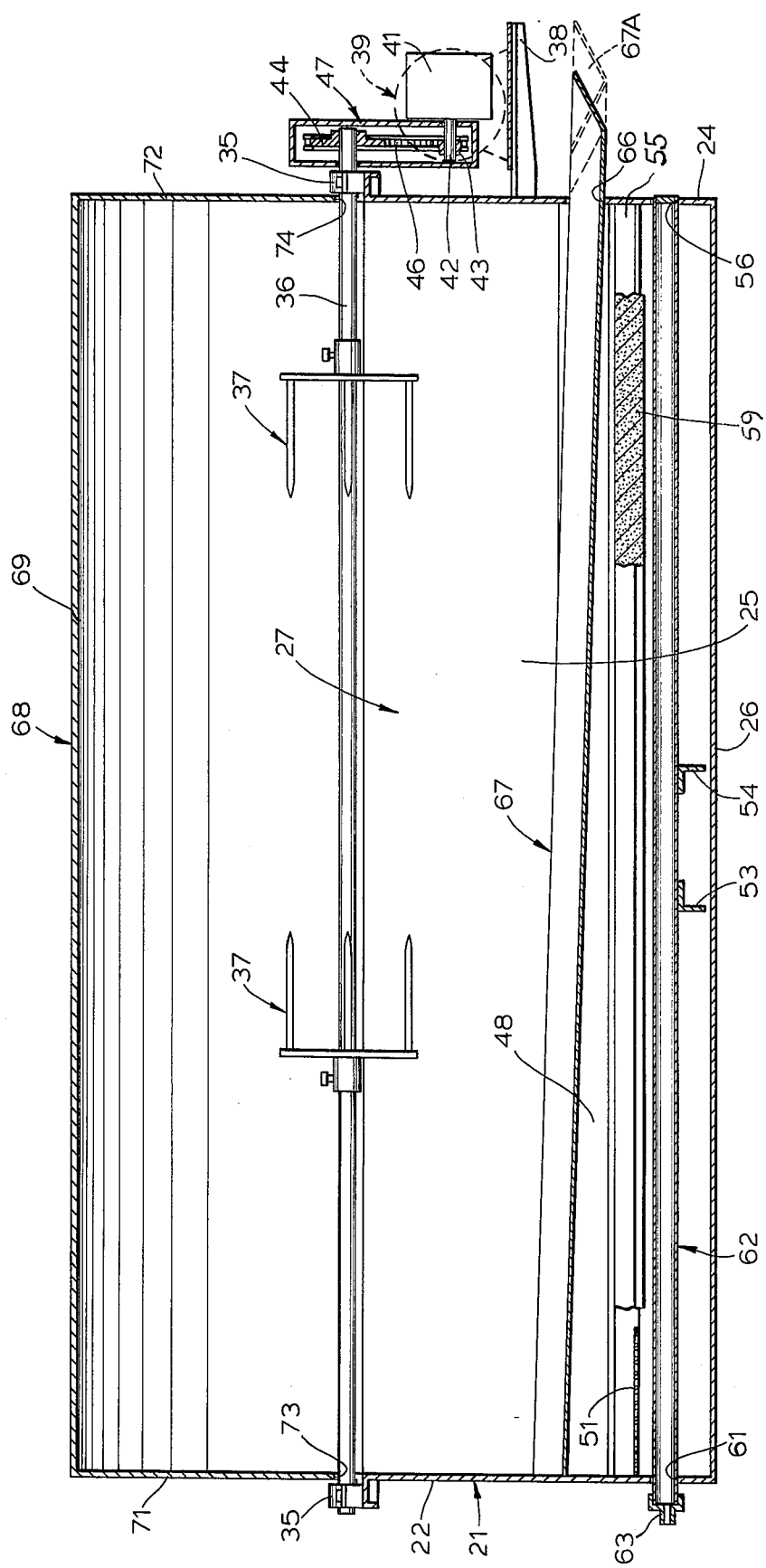
FIG. 6 is a sectional view taken along the line VI—VI of FIG. 3.

A pair of support members 53 and 54 (FIG. 6) are secured to and extend between the panels 48 and 49. A hole 56 is provided in the rear wall 24 of the chamber 27 and at a height about equal to the height of the support member 54. Similarly, a hole 61 is provided in the front wall 22 of the chamber 27 and is at an elevation that is approximately equal to the elevation of the bracket 53. A burner unit 62 has an inlet portion which is received in the hole 61 and is supported at one end in the hole 61 and at the other end in the hole 56 and in the middle on the brackets 53 and 54. An inlet connector 63 is connected to the externally exposed portion of the burner unit.

Figures 4, 5:
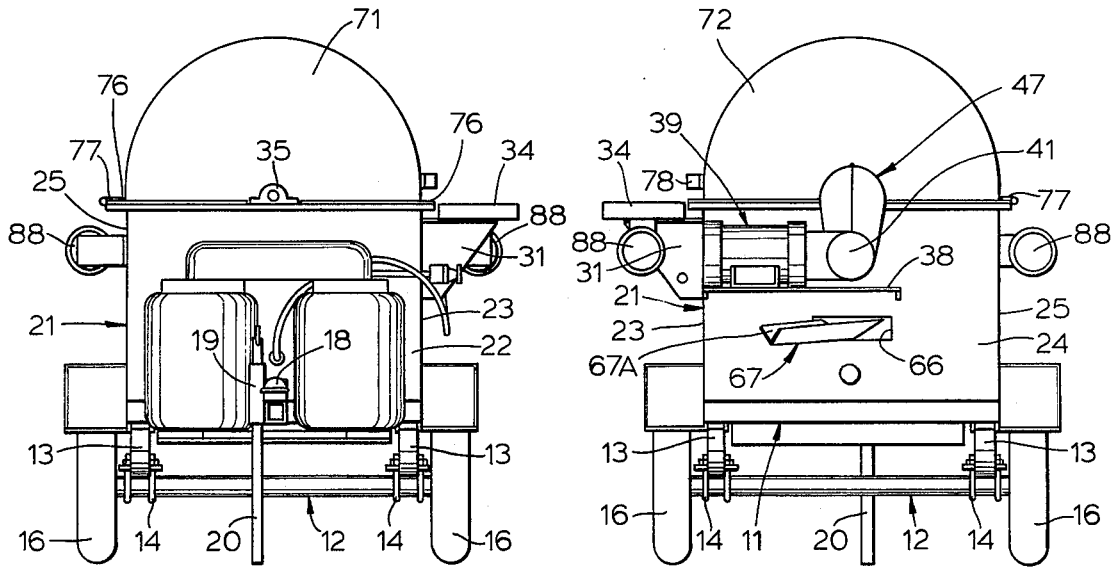
FIG. 4 is a front view thereof.
FIG. 5 is a rear view thereof.

A hole 66 is provided in the rear wall 24 of the chamber 27 and is spaced above the hole 56. The hole 66 has a rectangular configuration as illustrated in FIGS. 5 and 7. A V-shaped trough 67 is secured at one end to the internal surface of the front wall 22 of the chamber 27 and extends downwardly therefrom inclined to the horizontal through the opening 66. The external portion 67A of the trough 67 projects beyond the opening 66. If desired, a conventional type of collection device may be provided at the terminal end of the trough 67. The trough 67 is spaced above the fire brick 59 and the burner unit 62. The purpose of this construction will be explained below.

A cover 68 is mounted for movement between open and closed positions relative to the open top chamber 27. More specifically, the cover 68 includes an arcuate portion the axis of which closely approximates the axis of rotation of the rod 36. A pair of end walls 71 and 72 are secured to the arcuate portion 69. A notch 73 is provided in the end wall 71 and a similar notch 74 is provided in the end wall 72 both to accommodate the reception of the rod 36 therein when the cover 68 is in the closed position such as is illustrated in FIGS. 2 to 7. A rim 76 is provided around the periphery of the cover 68 and is adapted to rest on the rim 33 of the chamber 27. A plurality of hinges 77 are secured to the rim 76 on the cover 68 and to the rim 33 adjacent the upper edge of the sidewall 25 of the chamber 27 as illustrated in FIG. 7. A pair of handles 78 are secured to the cover 68 on the side thereof opposite the hinges 77 to facilitate a lifting of the cover 68 to the open position illustrated in FIG. 1. A pair of chains 79 are secured to and extend between the hood 68 and the sidewalls of the chamber 27 to limit the extent to which the cover 68 can be moved to the open position. The chains 79 will be easily accommodated within the chamber 27 when the cover 68 is in the closed position.

Figure 2:
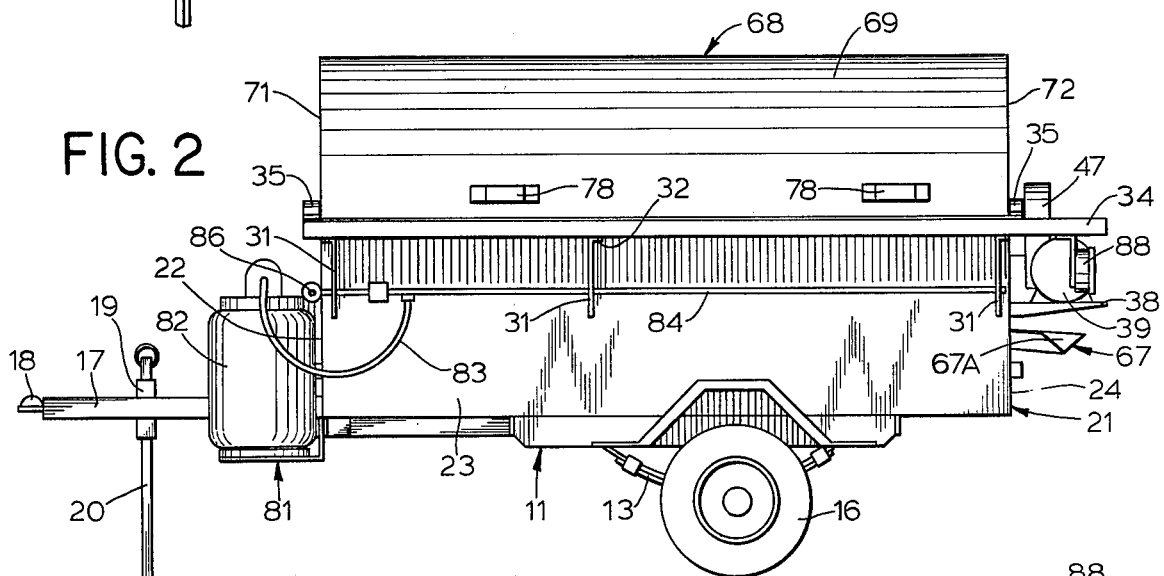
FIG. 2 is a right side view thereof.

A support bracket 81 is secured to the box 21 adjacent the front end thereof as best illustrated in FIGS. 1 and 2. The support bracket 81 is adapted to support a pair of tanks capable of holding a quantity of propane gas or other gaseous combustible type material. A conduit 83 extends from the usual outlets from the tank 82 to a distributor pipe 84 mounted in openings provided in the brackets 31 secured to the sidewall 23 of the box 21. The conduit 83 is connected to the distributor pipe 84 and a control valve 86 connected in circuit with the distributor 84 at the ends thereof can provide control of the gas flow to the burner unit 62. In this particular embodiment, piping is provided between the left end of the conduit 83 and valve 86 to the inlet connector 63 to the burner unit 62. As a result, the control valve 86 controls the quantity of gas supplied to the burner unit 62.

Figure 3:
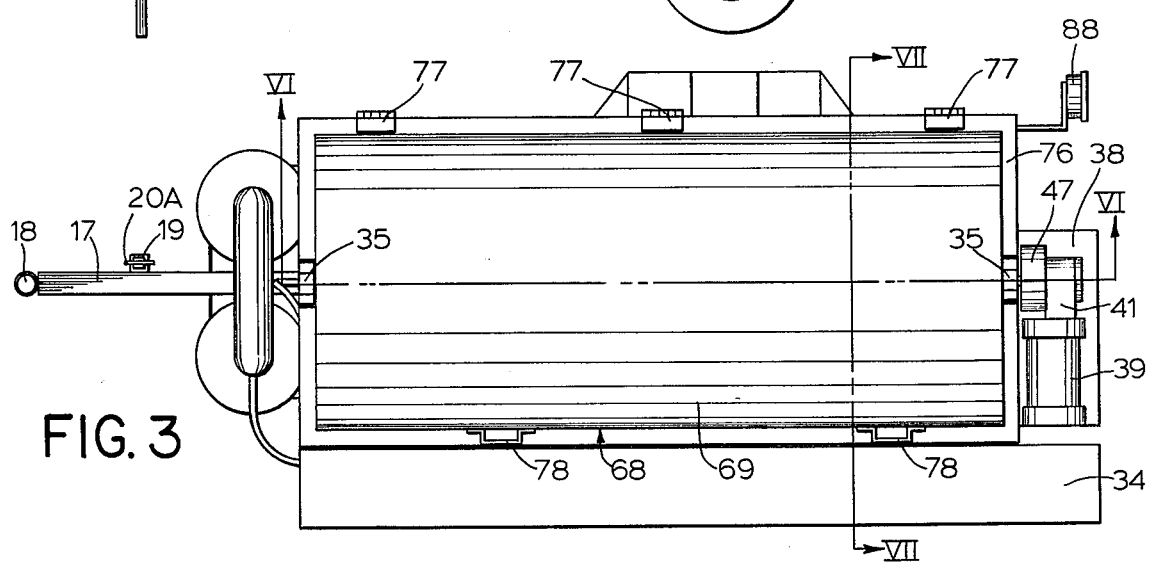
FIG. 3 is a top view thereof.

A pair of taillights 88 are secured to the mobile broiler rotisserie apparatus 10. In this embodiment, one of the taillights is secured to the underside of the support surface 34. The other taillight is secured directly to a sidewall of the box 21 as illustrated in FIG. 3. The taillights 88 are supplied with electrical power from the vehicle through wiring not illustrated.

OPERATION

Although the operation and use of the device embodying the invention has been indicated somewhat above, said operation will be described in detail hereinbelow for convenience.

When a person or organization decides to have an outdoor party with many invited guests, that person or organization usually does not have sufficient time to construct the apparatus for cooking the food for the many invited guests. Such person may be the manager of a restaurant, motel, hotel, golf course or the like and it is desired to rent such equipment or utilize the services of a professional organization capable of providing and cooking the food for the many invited guests. In the past, and when it is desired to cook the food over an open fire, crude cooking devices, such as cement blocks with grids thereon or oil drums which have been cut in half and have grids thereon have heretofore been utilized to provide a large fire chamber for holding the fire. However, rotisserie type equipment is not conveniently usable with this type of construction. In addition, any type of construction provided on the site makes it necessary for the particular person that is having the party to clean the apparatus following the event. The disclosure contained herein relates to a rotisserie device which makes it possible to rent such equipment or for a professional organization to cater an event and bring the cooking equipment to the site of the festivity. The mobile broiler rotisserie apparatus may be connected to a conventional trailer hitch on a vehicle and drawn to the site of the festivity. Thereafter, the trailer hitch may be disconnected from the vehicle and the post 20 adjusted to the proper elevation so that the rod 36 is level.

Thereafter, the valves (not shown) on the tanks 82 may be turned on and the valve 86 may be selectively turned on so that the gas coming from the openings in the burner unit 62 may be ignited to provide heat for cooking purposes. The control valve 86 may thereafter be selectively controlled to provide the proper amount of heat to the undersurface of the cooking surfaces.

During cooking of food mounted on the rod 36, the motor 39 and gear reducer 41 will effect a rotation of the rod 36 at a speed which is in the range of 0.5 to 1.0 rpm. If a large piece of meat has been mounted on the rod 36 between the food holding devices 37, the heat will cook the meat and juices will be formed thereon which will fall toward the bottom of the chamber 27. The rotational speed of the rod is carefully controlled so that the juices will fall into the trough 67. Since the width of the trough is generally 15 to 25 per cent of the total width of the chamber 27, the speed of rotation of the rod 36 is critical because a rotation which is too slow will cook the food too rapidly and will have a tendency to burn same and a rotation which is too fast will cause the juice forming on the food to fall outside of the trough 67 and onto the stones 52 thereby enhancing the chance for a flare-up within the rotisserie apparatus. It must be remembered that during a cooking of the food, the cover 68 is usually in the closed position. Thus, a flare-up of fire within the chamber 27 may go unnoticed for a period of time and the food on the rod 36 may become severely damaged and rendered inedible. Thus, I have found that controlling the speed of rotation of the rod 36 to the aforementioned range will adequately prevent the aforesaid flare-up situation.

In addition, the location of the burner unit 62 beneath the trough 67 will keep the juices collecting in the trough 67 heated to a sufficient level so that they will flow down the incline of the trough out through the opening 66. The fire brick 59 serves to deflect the heat from the burner unit 62 but yet keep the trough hot enough to permit the juices to flow thereon. As indicated above, a convenient collection device may be provided beneath the terminal end of the outer extension 67A of the trough 67 for collection of the juice for serving with the cooked food.

At the completion of the cooking operation, the mobile broiler rotisserie apparatus can be quickly placed into an arrangement for towing by a vehicle by again attaching the hitch device 18 to the trailer hitch on a vehicle and transporting same back to the original location for clean-up purposes. As a result, the particular person and/or organization which had the festivity does not need to be concerned with clean-up procedures concerning the cooking apparatus.

Although a particular preferred embodiment of the invention has been disclosed in detail for illustrative purposes, it will be recognized that variations or modification of the disclosed apparatus, including the rearrangement of parts lie within the scope of the present invention.

The embodiments of the invention in which an exclusive property or privilege is claimed are defined as follows:

1. A mobile broiler rotisserie apparatus, comprising:
   trailer frame means including road engaging wheel means and hitch means for connection to a vehicle;
   an open top chamber having sidewalls and a bottom wall mounted on said trailer frame means, said chamber including support means adjacent the upper edge of a pair of sidewalls to the open top chamber;
   rotatable food supporting means rotatably supported on said support means in spaced relation from said bottom wall of said chamber;
   controllable heat generating means positioned in the spacing between said food supporting means and said bottom wall for cooking foods supported on said food supporting means;
   hood means pivotally secured to an upper edge of said open top chamber and movable between open and closed positions relative to said open top of said chamber means;
   elongated trough means mounted in said chamber and above said controllable heat generating means and in vertical alignment with said rotatable food supporting means, one of said walls of said chamber having an opening therein, the longitudinal axis of said trough means extending parallel to the axis of rotation of said rotatable food supporting means and at an incline to the horizontal downwardly out through said opening in one of said walls of said chamber, said trough means occupying the range of 15 to 25 percent of the width of said chamber viewed in a direction parallel to said axis of rotation; and
   drive means operatively connected to said rotatable food supporting means and having a rotatable output characteristic in the range of 0.5 to 1.0 rpm whereby the juice from foods mounted on said rotatable food supporting means will fall therefrom during cooking and into said trough means and whereby the heat from said heat generating means will maintain the collected juice in said trough means in liquid form so that it will flow down the incline of said trough means and out through said opening for external collection.

2. A mobile broiler rotisserie apparatus according to claim 1, wherein said hood means has an arcuate contour in a plane perpendicular to the axis of rotation of said rotatable food supporting means, the center point of the radius for use arcuate contour being generally coincident with the axis of rotation of said rotatable food supporting means.

3. A mobile broiler rotisserie apparatus according to claim 1, wherein said trailer frame means includes bracket means for supporting containers for fuel for said controllable heat generating means.

4. A mobile broiler rotisserie apparatus according to claim 1, including lighting means for connection to a vehicle lighting system.

* * * * *